US012669471B2

(12) United States Patent
Chen et al.

(10) Patent No.: US 12,669,471 B2
(45) Date of Patent: Jun. 30, 2026

(54) DIFFERENTIAL EDDY CURRENT INTERNAL INSPECTION PROBE, ARRAYED PROBE, AND DEFECT INSPECTION DEVICE AND METHOD

(71) Applicant: China Special Equipment Inspection & Research Institute, Beijing (CN)

(72) Inventors: Jinzhong Chen, Beijing (CN); Jiaxing Xin, Beijing (CN); Xiaolong Li, Beijing (CN); Runkun Lu, Beijing (CN); Chang Liu, Beijing (CN); Xiaokang Wan, Beijing (CN)

(73) Assignee: China Special Equipment Inspection & Research Institute (CN)

( * ) Notice: Subject to any disclaimer, the term of this patent is extended or adjusted under 35 U.S.C. 154(b) by 171 days.

(21) Appl. No.: 18/830,277

(22) Filed: Sep. 10, 2024

(65) Prior Publication Data

US 2025/0297987 A1 Sep. 25, 2025

(30) Foreign Application Priority Data

Mar. 22, 2024 (CN) .......................... 202410338075.4

(51) Int. Cl.
G01N 27/90 (2021.01)

(52) U.S. Cl.
CPC ................................ G01N 27/9006 (2013.01)

(58) Field of Classification Search
None
See application file for complete search history.

(56) References Cited

U.S. PATENT DOCUMENTS

2020/0271622 A1* 8/2020 Chen .................. G01N 27/9006

* cited by examiner

Primary Examiner — Jas A Sanghera
(74) Attorney, Agent, or Firm — Gloria Tsui-Yip; Gottlieb, Rackman & Reisman, P.C.

(57) ABSTRACT

A differential eddy current internal inspection probe, an arrayed probe, and a defect inspection device and method are provided. The probe includes an excitation coil, a first receiving coil, and a second receiving coil. The first receiving coil and the second receiving coil are symmetrically attached to both sides of the excitation coil, and bottom surfaces of the first receiving coil, the excitation coil and the second receiving coil are located in a same plane. When an inspected pipeline is subjected to direct current magnetization, the differential eddy current internal inspection probe is configured to inspect inner surface defects, buried defects and outer surface defects of the inspected pipeline. When the inspected pipeline is not subjected to direct current magnetization, the differential eddy current internal inspection probe is configured to inspect the inner surface defects of the inspected pipeline.

14 Claims, 12 Drawing Sheets

Inspecting inner surface defect

Inspecting inner surface defects, buried
defects and outer surface defects

DIFFERENTIAL EDDY CURRENT INTERNAL INSPECTION PROBE, ARRAYED PROBE, AND DEFECT INSPECTION DEVICE AND METHOD

CROSS-REFERENCE TO RELATED APPLICATION

This patent application claims the benefit and priority of Chinese Patent Application No. 2024103380754 filed with the China National Intellectual Property Administration on Mar. 22, 2024, the disclosure of which is incorporated by reference herein in its entirety as part of the present application.

TECHNICAL FIELD

The present disclosure relates to the technical field of pipeline nondestructive inspection, and in particular to a differential eddy current internal inspection probe, an arrayed probe, and a defect inspection device and method.

BACKGROUND

Eddy current nondestructive inspection is a widely used nondestructive inspection method, which has some advantages such as high sensitivity and non-contact. The eddy current nondestructive inspection is used to inspect defects in materials by inducing the changes in eddy current. When performing high-speed inspection on the pipeline, in order to improve the inspection accuracy, it is necessary to increase the excitation frequency of eddy current. However, due to the influence of skin effect, the penetration depth of the eddy current decreases with the increase of the excitation frequency, making it difficult to inspect buried defects and outer surface defects of the pipeline, and high sensitivity also leads to large noise of the output signal, which is difficult to quantify.

Based on this, there is an urgent need for a technology that can used to inspect buried defects and outer surface defects of a pipeline and has a high signal-to-noise ratio.

SUMMARY

An objective of the present disclosure is to provide a differential eddy current internal inspection probe, an arrayed probe, and a defect inspection device and method, which can inspect the inner surface defects, buried defects and outer surface defects of an inspected pipeline, has the high signal-to-noise ratio, and can achieve the inspection and quantification of tiny defects.

To achieve the objective above, the present disclosure employs the following technical solutions.

A differential eddy current internal inspection probe includes an excitation coil, a first receiving coil, and a second receiving coil.

The excitation coil is located between the first receiving coil and the second receiving coil, the first receiving coil and the second receiving coil are symmetrically attached to both sides of the excitation coil, and bottom surfaces of the first receiving coil, the excitation coil and the second receiving coil are located in a same plane to form a bottom surface of the differential eddy current internal inspection probe.

The excitation coil is used to be energized with an alternating current to generate induced eddy current fields in an inspected pipeline.

The first receiving coil and the second receiving coil are opposite in winding direction. The first receiving coil is configured to receive an induced magnetic field generated by an induced eddy current field at a first position of the inspected pipeline and to output a first voltage signal. The second receiving coil is configured to receive an induced magnetic field generated by an induced eddy current field at a second position of the inspected pipeline and to output a second voltage signal. The first position is a position, corresponding to a position of the first receiving coil, in the inspected pipeline, and the second position is a position, corresponding to a position of the second receiving coil, in the inspected pipeline.

The differential eddy current internal inspection probe is located in the inspected pipeline, and the bottom surface of the differential eddy current internal inspection probe is parallel to an axis of the inspected pipeline. When the inspected pipeline is subjected to direct current magnetization, the differential eddy current internal inspection probe is configured to inspect inner surface defects, buried defects and outer surface defects of the inspected pipeline based on a difference value between the first voltage signal and the second voltage signal. When the inspected pipeline is not subjected to the direct current magnetization, the differential eddy current internal inspection probe is configured to inspect the inner surface defects of the inspected pipeline based on the difference value between the first voltage signal and the second voltage signal. Types of the inner surface defects, buried defects and outer surface defects comprise cracks and corrosion.

In some embodiments, each of the excitation coil, the first receiving coil and the second receiving coil is a semicircular coil formed by winding a wire, an outer surface of the semicircular coil includes two semicircular surfaces, one curved surface, and one plane. Each semicircular surface comprises a straight segment and an arc segment.

A plane of the first receiving coil is attached to the straight segment of one semicircular surface of the excitation coil, and a plane of the second receiving coil is attached to the straight segment of another semicircular surface of the excitation coil.

The bottom surface of the first receiving coil is one semicircular surface of the first receiving coil, the bottom surface of the excitation coil is a plane of the excitation coil, and the bottom surface of the second receiving coil is one semicircular surface of the second receiving coil.

In some embodiments, a difference value between an inner diameter and an outer diameter of the semicircular surface of the excitation coil, a height of the first receiving coil and a height of the second receiving coil are equal.

An arrayed probe includes multiple differential eddy current internal inspection probes above.

The multiple differential eddy current internal inspection probes are distributed in an array in a circumferential direction, and excitation coils of the adjacent differential eddy current internal inspection probes are energized with alternating currents with different frequencies.

In some embodiments, the arrayed probe further includes a first frequency detection signal transmission electronic system and a second frequency detection signal transmission electronic system.

Any of the differential eddy current internal inspection probes is selected as a first differential eddy current internal inspection probe, and all the differential eddy current internal inspection probes are sequenced in a clockwise or counterclockwise direction. The first frequency detection signal transmission electronic system is connected to odd-numbered differential eddy current internal inspection probes. The second frequency detection signal transmission electronic system is connected to even-numbered differential eddy current internal inspection probes.

The first frequency detection signal transmission electronic system and the second frequency detection signal transmission electronic system have the same structure. The first frequency detection signal transmission electronic system includes an excitation source, a power amplifier, a frequency detector, and a filter-amplifying circuit connected in turn.

The excitation source is configured to generate an alternating current with a predefined frequency, and alternating currents generated by the first frequency detection signal transmission electronic system and the second frequency detection signal transmission electronic system have different predefined frequencies, respectively.

The power amplifier is connected to the differential eddy current internal inspection probes, and is configured to amplify the alternating current with the predefined frequency, and to feed the amplified alternating current into the differential eddy current internal inspection probes.

The frequency detector is connected to the differential eddy current internal inspection probes, and is configured to extract a signal with the predefined frequency from a mixed frequency signal output by the differential eddy current internal inspection probes. The mixed frequency signal includes a first voltage signal and a second voltage signal.

The filter-amplifying circuit is configured to perform amplification, filtering and noise reduction on the signal with the predefined frequency, so as to obtain a signal after filtering and noise reduction.

A defect inspection device includes a direct current magnetization component and an inspection component. The inspection component is the differential eddy current internal inspection probe or the arrayed probe above.

The direct current magnetization component is located in an inspected pipeline, is in contact with an inner surface of the inspected pipeline, and is configured to perform direct current magnetization on the inspected pipeline.

The inspection component is located in the inspected pipeline, and is configured to inspect inner surface defects, buried defects and outer surface defects of the inspected pipeline when the inspected pipeline is subjected to direct current magnetization, and to inspect the inner surface defects of the inspected pipeline when the inspected pipeline is not subjected to direct current magnetization. Types of the inner surface defects, buried defects and outer surface defects comprise cracks and corrosion.

In some embodiments, the direct current magnetization component includes a U-shaped yoke, and a first magnetic pole and a second magnetic pole of the U-shaped yoke are both in contact with the inner surface of the inspected pipeline. The inspection component is located between the first magnetic pole and the second magnetic pole, and a distance from the inspection component to the first magnetic pole is equal to a distance from the inspection component to the second magnetic pole.

A coil is installed on the U-shaped yoke, when the coil is energized with a direct current, the inspected pipeline is subjected to direct current magnetization; or a permanent magnet is installed on each of the first magnetic pole and the second magnetic pole to perform the direct current magnetization on the inspected pipeline.

A defect inspection method, which runs based on the defect inspection device above. The defect inspection method includes:

in a case that the outer surface defects or buried defects need to be inspected, performing direct current magnetization on an inspected pipeline using a direct current magnetization component, and performing defect inspection on the inspected pipeline using an inspection component; and in a case that the inner surface defects need to be inspected, performing defect inspection on the inspected pipeline using the inspection component; or performing direct current magnetization on the inspected pipeline using the direct current magnetization component, and performing defect inspection on the inspected pipeline using the inspection component.

In some embodiments, when the inspection component is a differential eddy current internal inspection probe, the defect inspection method further includes:

in a case that a defect with a defect angle of 0-45 degrees needs to be inspected, setting a normal vector of joint surfaces of a first receiving coil and an excitation coil of the differential eddy current internal inspection probe to be perpendicular to an axial direction of the inspected pipeline; in a case that a defect with a defect angle of 45-90 degrees needs to be inspected, setting the normal vector of the joint surfaces of the first receiving coil and the excitation coil of the differential eddy current internal inspection probe to be parallel to the axial direction of the inspected pipeline, wherein the defect angle is an included angle between a length direction of the defect and the axial direction of the inspected pipeline.

According to specific embodiments of the present disclosure, the present disclosure has the following technical effects:

A differential eddy current internal inspection probe, an arrayed probe, and a defect inspection device and method are provided. The differential eddy current internal inspection probe includes an excitation coil, a first receiving coil, and a second receiving coil. The excitation coil is located between the first receiving coil and the second receiving coil. The first receiving coil and the second receiving coil are symmetrically attached to both sides of the excitation coil, and bottom surfaces of the first receiving coil, the excitation coil and the second receiving coil are located in a same plane. When an inspected pipeline is subjected to direct current magnetization, the differential eddy current internal inspection probe is configured to inspect inner surface defects, buried defects and outer surface defects of the inspected pipeline. When the inspected pipeline is not subjected to direct current magnetization, the differential eddy current internal inspection probe is configured to inspect the inner surface defects of the inspected pipeline. Therefore, inner surface defects, buried defects and outer surface defects of the inspected pipeline can be inspected by combining eddy current inspection and direct current magnetization. By adopting a unique structure of single excitation and double reception, a signal-to-noise ratio can be improved, and the inspection and quantification of tiny defects can be achieved.

BRIEF DESCRIPTION OF THE DRAWINGS

To describe the technical solutions of the embodiments of the present disclosure or in the prior art more clearly, the following briefly introduces the accompanying drawings required for describing the embodiments. Apparently, the accompanying drawings in the following description show merely some embodiments of the present disclosure, and those of ordinary skill in the art may still derive other drawings from these accompanying drawings without creative efforts.

In the drawings.

Figure 1A:
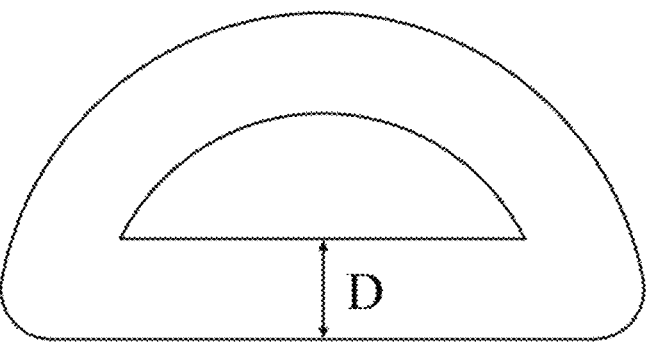
FIG. 1A is a front view of the excitation coil.
Figure 1B:
FIG. 1B is a left view of the excitation coil.
Figure 1C:
FIG. 1C is a top view of the excitation coil.
Figure 1D:
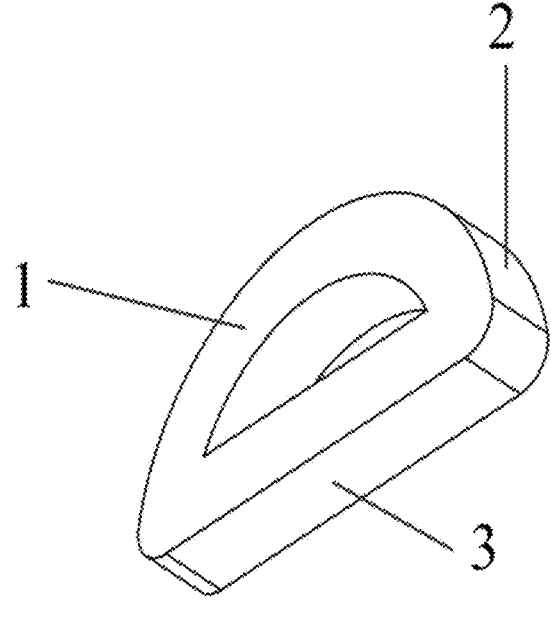
FIG. 1D is a three-dimensional diagram of the excitation coil.
Figure 2A:
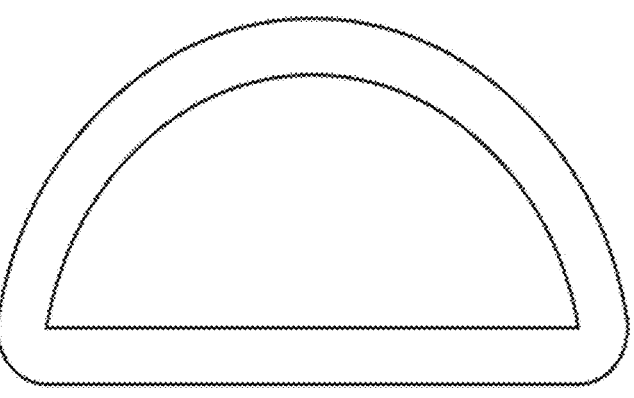
FIG. 2A is a top view of the receiving coil.
Figure 2B:
FIG. 2B is a left view of the receiving coil.
Figure 2C:
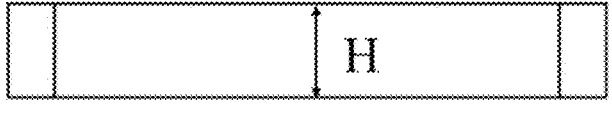
FIG. 2C is a front view of the receiving coil.
Figure 2D:
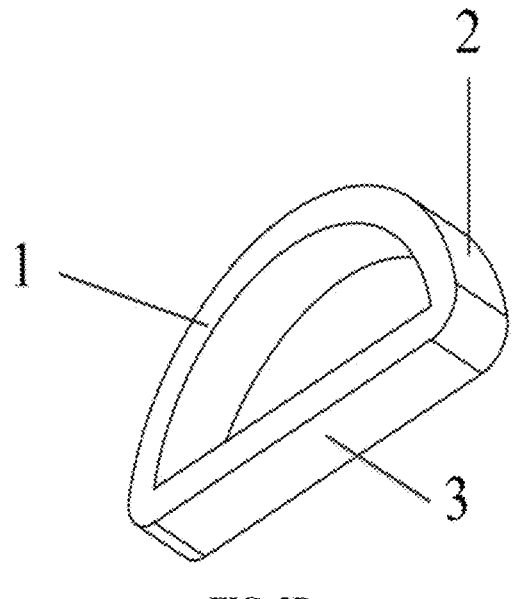
FIG. 2D is a three-dimensional diagram of the receiving coil.
Figure 3A:
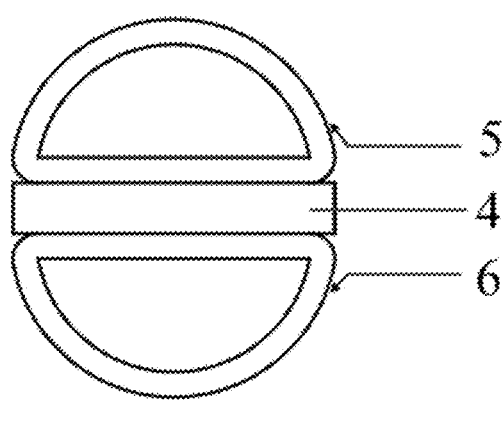
FIG. 3A is a top view of the differential eddy current internal inspection probe.
Figure 3B:
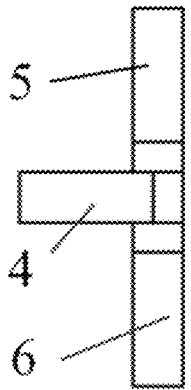
FIG. 3B is a left view of the differential eddy current internal inspection probe.
Figure 3C:
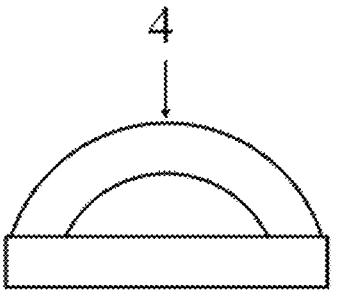
FIG. 3C is a front view of the differential eddy current internal inspection probe.
Figure 3D:
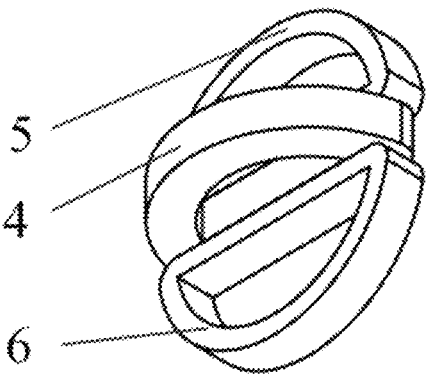
FIG. 3D is a three-dimensional diagram of the differential eddy current internal inspection probe.

1—semicircular surface; 2—curved surface; 3—plane; 4—excitation coil; 5—first receiving coil; 6—second receiving coil; 7—differential eddy current internal inspection probe; 8—U-shaped yoke; 9—first magnetic pole; 10—second magnetic pole; 11—coil.

DETAILED DESCRIPTION OF THE EMBODIMENTS

The following clearly and completely describes the technical solutions in the embodiments of the present disclosure with reference to the accompanying drawings in the embodiments of the present disclosure. Apparently, the described embodiments are merely a part rather than all of the embodiments of the present disclosure. All other embodiments obtained by a person of ordinary skill in the art based on the embodiments of the present disclosure without creative efforts shall fall within the protection scope of the present disclosure.

An objective of the present disclosure is to provide a differential eddy current internal inspection probe, an arrayed probe, and a defect inspection device and method, which can inspect the inner surface defects, buried defects and outer surface defects of an inspected pipeline, has the high signal-to-noise ratio, and can achieve the inspection and quantification of tiny defects.

In order to make the objectives, features and advantages of the present disclosure more clearly, the present disclosure is further described in detail below with reference to the embodiments.

Embodiment 1

A differential eddy current internal inspection probe (may also called a differential sensing probe) is provided by this embodiment, which employs a unique differential structure with single excitation and dual reception. The differential eddy current internal inspection probe includes an excitation coil, a first receiving coil, and a second receiving coil.

The excitation coil is located between the first receiving coil and the second receiving coil, the first receiving coil and the second receiving coil are symmetrically attached to both sides of the excitation coil, that is, the first receiving coil and the second receiving coil are symmetrically placed on both sides of the excitation coil, and attached to side surfaces of the excitation coil. Bottom surfaces of the first receiving coil, the excitation coil and the second receiving coil are located in a same plane to form a bottom surface of the differential eddy current internal inspection probe. Due to the fact that the bottom surfaces of the first receiving coil, the excitation coil and the second receiving coil are located on the same plane (i.e., in the same plane), the distances from the first receiving coil, the excitation coil and the second receiving coil to the inner surface of the inspected pipeline may be consistent, so as to avoid affecting the subsequent process of defect inspection through difference.

The excitation coil is used to be energized with an alternating current, a varying magnetic field can be generated in a space after the alternating current is introduced, and thus induced eddy current fields are generated in the inspected pipeline.

The first receiving coil and the second receiving coil are opposite in winding direction. In some embodiments, the first receiving coil and the second receiving coil have the same parameters except that the winding directions are opposite. The first receiving coil is configured to receive an induced magnetic field generated by an induced eddy current field at a first position of the inspected pipeline, and to convert the induced magnetic field into a voltage signal for output, so as to output a first voltage signal. The second receiving coil is configured to receive an induced magnetic field generated by an induced eddy current field at a second position of the inspected pipeline and to convert the induced magnetic field into a voltage signal for output, so as to output a second voltage signal. The first position is a position, corresponding to a position of the first receiving coil, in the inspected pipeline, i.e., a position in the inspected pipeline located below the first receiving coil. The second position is a position, corresponding to a position of the second receiving coil, in the inspected pipeline, i.e., a position in the inspected pipeline located below the second receiving coil.

In this embodiment, the differential eddy current internal inspection probe employs a differential coil structure with single excitation and double reception, which can reduce the volume of the traditional differential coil; reduce the energy consumption and have a high signal-to-noise ratio of a differential output, compared with the differential coil structure with double excitation; and achieve the inspection and quantification of tiny defects. Therefore, the differential eddy current internal inspection probe has the advantages of small volume, low energy consumption, high signal-to-noise ratio, and capability of inspecting tiny defects.

In this embodiment, a structure of the excitation coil is as shown in FIGS. 1A-1D, which is a semicircular structure formed by winding a wire. The first receiving coil and the second receiving coil have the same structure, the structure is as shown in FIGS. 2A-2D, which is made into a semicircular structure by winding a wire. Each of the excitation coil, the first receiving coil and the second receiving coil is a semicircular coil formed by winding the wire, an outer surface of the semicircular coil includes two semicircular surfaces 1, one curved surface 2, and one plane 3. Each semicircular surface 1 includes a straight segment, and an arc segment. The wire may be a copper wire.

On the basis that the excitation coil, the first receiving coil and the second receiving coil are all semicircular coils, the structure of the differential eddy current internal inspection probe is shown in FIGS. 3A-3D. The excitation coil 4 is vertically placed in the middle, and a pair of receiving coils (i.e., the first receiving coil 5 and the second receiving coil 6) are horizontally and symmetrically placed on both sides of the excitation coil 4, and the bottom surfaces of the excitation coil 4 and the pair of receiving coils are in the same plane, and thus the distances from the excitation coil 4 and the pair of receiving coils to the inner surface of the inspected pipeline are consistent. Specifically, the plane 3 of the first receiving coil 5 is attached to the straight segment of one semicircular surface 1 of the excitation coil 4, and the plane 3 of the second receiving coil 6 is attached to the straight segment of another semicircular surface 1 of the excitation coil 4. The bottom surface of the first receiving coil 5 is one semicircular surface 1 of the first receiving coil 5, the bottom surface of the excitation coil 4 is the plane 3 of the excitation coil 4, and the bottom surface of the second receiving coil 6 is one semicircular surface 1 of the second receiving coil 6.

In this embodiment, a difference value D between an inner diameter and an outer diameter of the semicircular surface 1 of the excitation coil 4, a height H of the first receiving coil 5 and a height H of the second receiving coil 6 are equal, that is H=D, which is beneficial for better attachment between the excitation coil 4 and the first receiving coil 5, and between the excitation coil 4 and the second receiving coil 6.

In order to achieve the inspection of inner surface defects, buried defects and outer surface defects by a high-frequency excitation eddy current technology, the eddy current inspection and the direct current magnetization are combined to make the buried defects and outer surface defects of the pipeline present uneven distribution of magnetic permeability on the inner surface, thus "mapping" defect features on the inner surface. When the defects of the inspected pipeline need to be inspected, the differential eddy current internal inspection probe is placed in the inspected pipeline, and the bottom surface of the differential eddy current internal inspection probe is placed horizontally with the inner surface of the inspected pipeline. That is, the differential eddy current internal inspection probe is located in the inspected pipeline, and the bottom surface of the differential eddy current internal inspection probe is parallel to the axis of the inspected pipeline. When the inspected pipeline is subjected to direct current magnetization, the differential eddy current internal inspection probe is configured to inspect the inner surface defects, buried defects and outer surface defects of the inspected pipeline based on a difference value between the first voltage signal and the second voltage signal. When the inspected pipeline is not subjected to direct current magnetization, the differential eddy current internal inspection probe is configured to inspect the inner surface defects of the inspected pipeline based on the difference value between the first voltage signal and the second voltage signal. Types of the inner surface defects, buried defects and outer surface defects include cracks and corrosion.

Figure 4A:
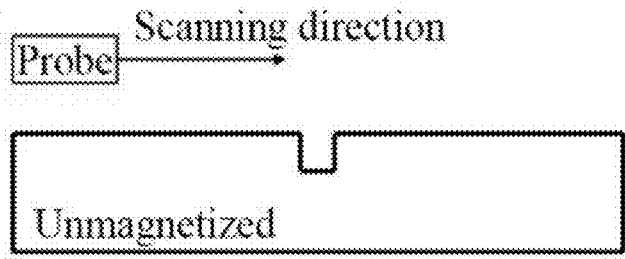
FIG. 4A is an inspection mode when an inspected pipeline is not subjected to direct current magnetization.
Figure 4B:
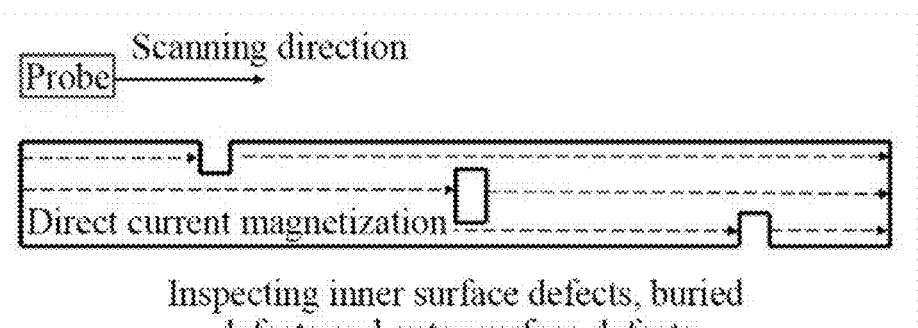
FIG. 4B is an inspection mode when an inspected pipeline is subjected to direct current magnetization.

Specifically, as shown in FIGS. 4A-4B, a scanning direction in FIGS. 4A-4B represents a moving direction of the differential eddy current internal inspection probe when moving along the inspected pipeline, i.e., an axial direction of the inspected pipeline. The differential eddy current internal inspection probe in this embodiment has two defect inspection modes.

(1) As shown in FIG. 4A, when the inspected pipeline is not subjected to direct current magnetization, the differential eddy current internal inspection probe can only inspect the inner surface defects of the inspected pipeline.

(2) As shown in FIG. 4B, when the inspected pipeline is subjected to direct current magnetization, the differential eddy current internal inspection probe can inspect the inner surface defects, buried defects and outer surface defects of the inspected pipeline.

Figure 5:
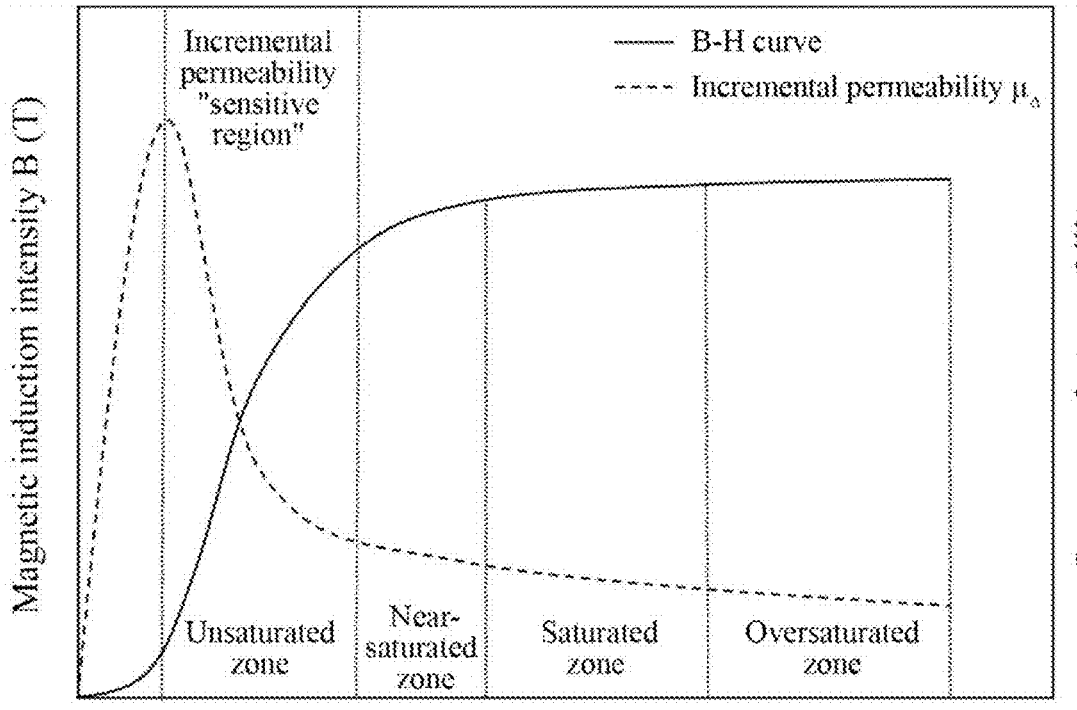
FIG. 5 is a schematic diagram of a characteristic curve of a ferromagnetic material according to Embodiment 1 of the present disclosure.

The material of the inspected pipeline of this embodiment is ferromagnetic material. After the inspected pipeline is determined, a B (magnetic induction intensity)-H (magnetic field intensity) curve and a $\mu_A$ (incremental permeability)-H (magnetic field intensity) curve corresponding to the material of the inspected pipeline can be obtained. As shown in FIG. 5, the direct current magnetization degree of the inspected pipeline can be adjusted based on the B-H curve and the $\mu_A$-H curve. In some embodiments, the inspected pipeline is magnetized to an incremental permeability sensitive region shown in FIG. 5. The incremental permeability sensitive region is a curve segment of the $\mu_A$-H curve where the incremental permeability changes rapidly with the change of the magnetic field intensity. This incremental permeability sensitive region can be determined by observing FIG. 5, and then the magnetic field intensity of the inspected pipeline can be adjusted to be within the range of the magnetic field intensity corresponding to the incremental permeability sensitive region.

The buried defects and outer surface defects cause the decrease of relative permeability at a corresponding position of the inner surface of the inspected pipeline after the inspected pipeline is subjected to direct current magnetization, and the decrease of the relative permeability leads to the increase of a penetration depth of eddy current at the position and increase the intensity of an eddy current field at the same penetration depth. Compared with a defect-free position, the generated eddy current field is different, and finally, an output current of the receiving coil is different, thus achieving the purpose of inspecting the inner surface defects, buried defects and outer surface defects of the pipeline.

Figure 6A:
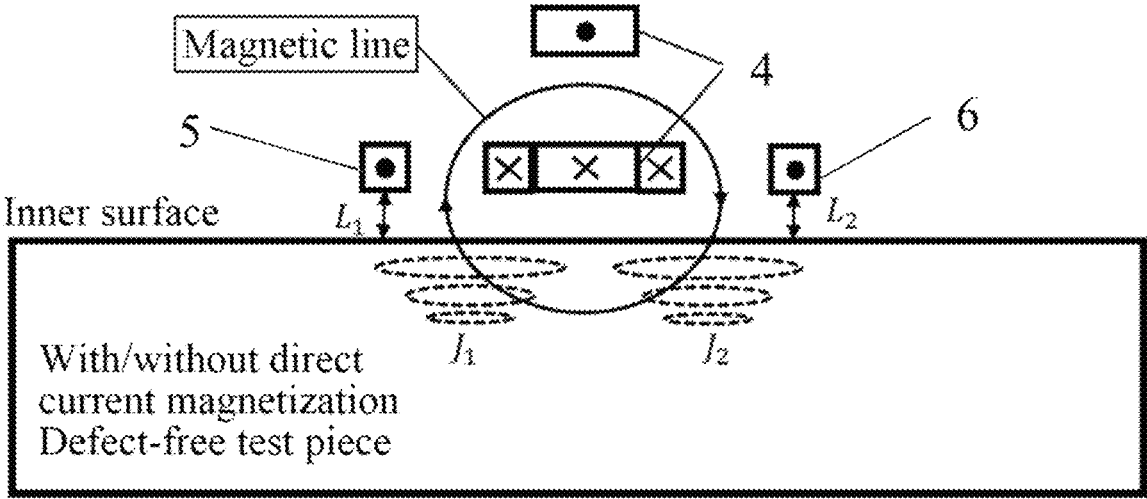
FIG. 6A is a schematic diagram of the inspection principle when there is no defect.

FIG. 6A is a schematic diagram of inspection principle of the inspected pipeline when there is no defect. In FIG. 6A $L_1$ is a distance from the first receiving coil 5 to the inner surface of the inspected pipeline, and $L_2$ is a distance from the second receiving coil 6 to the inner surface of the inspected pipeline. After the excitation coil 4 is energized with alternating current excitation (i.e., alternating current), a varying magnetic field can be generated in the inspected pipeline below the first receiving coil 5 and the second receiving coil 6. According to Lenz's law, induced eddy current fields can be generated inside the inspected pipeline, including an induced eddy current field $J_1$ below the first receiving coil 5 and an induced eddy current field $J_2$ below the second receiving coil 6, so as to further generate induced magnetic fields. Both the first receiving coil 5 and the second receiving coil 6 can receive the induced magnetic fields generated by the pipeline below and output a first voltage signal and a second voltage signal, respectively. Because the intensities of the induced eddy current fields under the first receiving coil 5 and the second receiving coil 6 are the same, the received magnetic field signals are completely symmetrical, and thus the first voltage signal and the second voltage signal are equal, and a value of an output differential signal at this time is 0. It needs to be noted that whether the inspected pipeline is subjected to direct current magnetization or not, the results are the same, i.e., the value of the differential signal is 0.

Figure 6B:
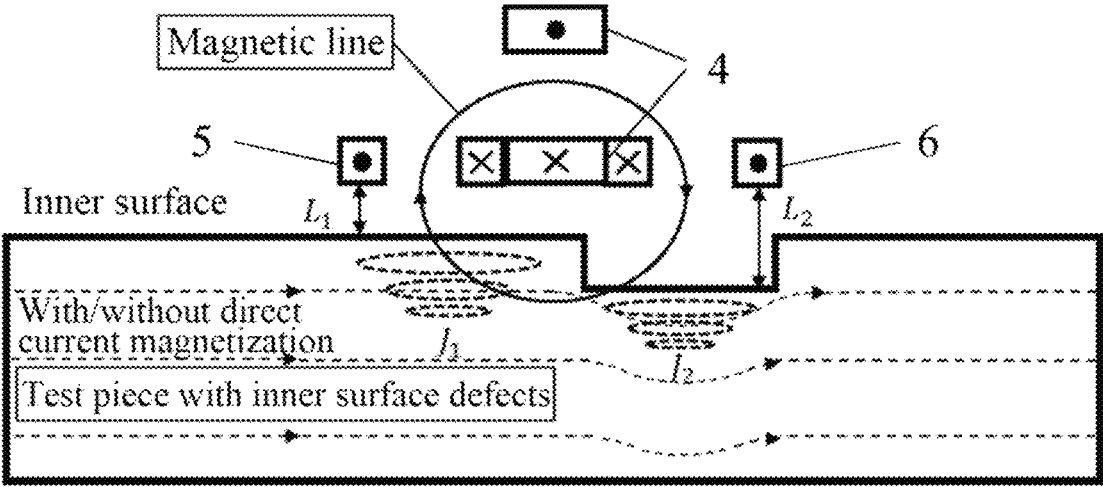
FIG. 6B is a schematic diagram of the inspection principle of inner surface defects.

FIG. 6B is a schematic diagram of the inspection principle of an inner surface defect of the inspected pipeline, the magnitude of the induced eddy current fields $J_1$ and $J_2$ is related to the relative permeability $\mu$ and conductivity $\sigma$ of the surface of the inspected pipeline. When the second receiving coil 6 is located above the defect, as the material at the inner surface defect is air (with the conductivity $\sigma$ of 0), a liftoff (i.e., a distance value) $L_2$ between the second receiving coil 6 and the inner surface of the inspected pipeline is greater than a liftoff $L_1$ between the first receiving coil 5 and the inner surface of the inspected pipeline. Under the same excitation, the greater the liftoff, the greater the intensity attenuation of the excitation magnetic field, and the smaller the eddy current field generated on the inner surface of the inspected pipeline. Therefore, the induced eddy current field $J_2$ is smaller than the induced eddy current field $J_1$, the second voltage signal generated by the second receiving coil 6 is less than the first voltage signal generated by the first receiving coil 5, and an output differential signal at this time is less than 0. It needs to be noted that whether the inspected pipeline is subjected to direct current magnetization or not, the results are the same, i.e., the value of the differential signal is less than 0.

Figure 6C:
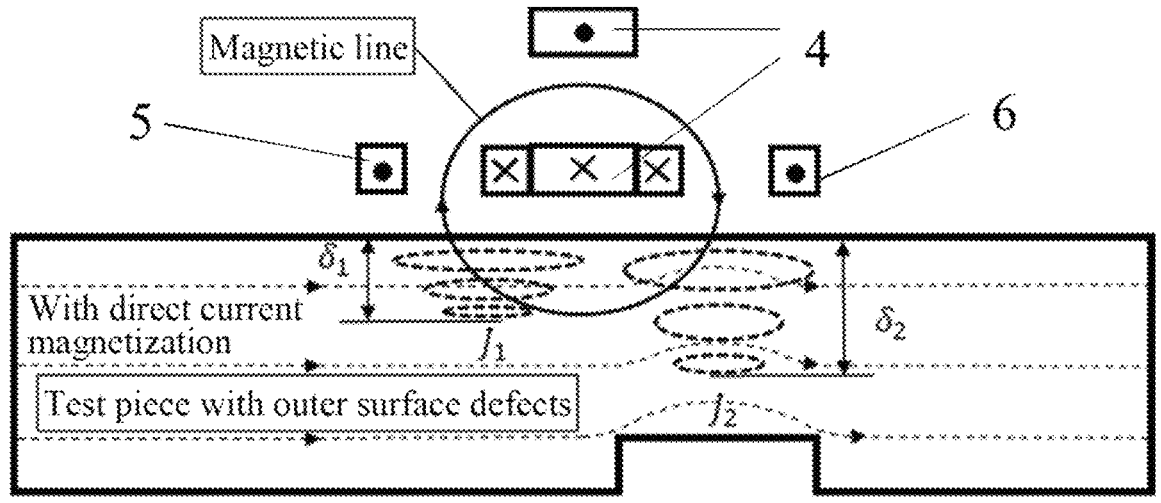
FIG. 6C is a schematic diagram of the inspection principle of outer surface defects.

FIG. 6C is a schematic diagram of the inspection principle of an outer surface defect of the inspected pipeline, indicating the principle of inspecting the outer surface defects of the inspected pipeline under direct current magnetization. In FIG. 6C, $\delta_1$ is a penetration depth of the induced eddy current field $J_1$, $\delta_2$ is a penetration depth of the induced eddy current field $J_2$, the outer surface defect leads to the increase of magnetic field intensity H at a corresponding position of the inner surface, and the decrease of the permeability $\mu$. The smaller the permeability $\mu$, the slower the attenuation of the induced eddy current field J in a penetration depth direction, and the greater the eddy current density at the same depth d. When the second receiving coil 6 is located above the outer surface defect, the total intensity of the induced eddy current field $J_2$ is greater than that of the induced eddy current field $J_1$, the second voltage signal generated by the second receiving coil 6 is greater than the first voltage signal generated by the first receiving coil 5, and at this time, an output differential signal is greater than 0, and differential signals generated by the inner and outer surface defects are opposite in phase.

In this embodiment, the differential eddy current and the direct current magnetization are combined to allow the buried defects and outer surface defects of the pipeline to exhibit uneven distribution of magnetic permeability on the inner surface, thus "mapping" defect features on the inner surface. Thus, the differential eddy current internal inspection probe in this embodiment can inspect the inner surface defects, buried defects and outer surface defects under high frequency excitation.

In this embodiment, when the defect with a defect angle of 0-45 degrees needs to be inspected, a normal vector of joint surfaces of the first receiving coil 5 and the excitation coil 4 of the differential eddy current internal inspection probe is set to be perpendicular to an axial direction of the inspected pipeline. When a defect with a defect angle of 45-90 degrees needs to be inspected, the normal vector of the joint surfaces of the first receiving coil and the excitation coil of the differential eddy current internal inspection probe is set to be parallel to the axial direction of the inspected pipeline. The defect angle is an included angle between a length direction of the defect and the axial direction of the inspected pipeline.

Specifically, the bottom of the differential eddy current internal inspection probe is placed horizontally with respect to the inner surface of the inspected pipeline, and the probe can be placed in two ways.

Figure 7A:
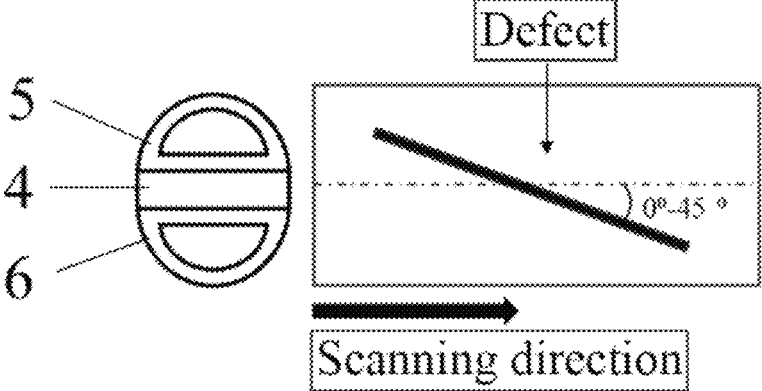
FIG. 7A is a placement mode for inspecting defects of 0°-45°.

(1) As shown in FIG. 7A, a direction of the excitation coil 4 is placed horizontally with respect to a scanning direction. The direction of the excitation coil 4 is perpendicular to the normal vector of the joint surfaces of the first receiving coil 5 and the excitation coil 4 of the differential eddy current internal inspection probe, and the scanning direction is a moving direction of the differential eddy current internal inspection probe when moving along the inspected pipeline, i.e., the axial direction of the inspected pipeline, which is equivalent to a situation that the normal vector of the joint surfaces of the first receiving coil 5 and the excitation coil 4 of the differential eddy current internal inspection probe is perpendicular to the axial direction of the inspected pipeline. At this time, two receiving coils (namely, the first receiving coil 5 and the second receiving coil 6) placed left and right with respect to the axis of the inspected pipeline pass through the defect successively. Such a way is suitable for inspecting defects with a defect direction angled with respect to the scanning direction at an included angle of 0°-45°, and the defect direction refers to the length direction of the defect.

Figure 7B:
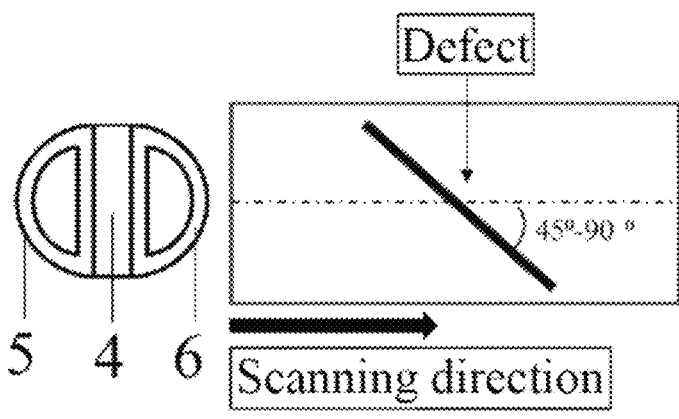
FIG. 7B is a placement mode for inspecting defects of 45°-90°.

(2) As shown in FIG. 7B, the direction of the excitation coil 4 is placed vertically with respect to the scanning direction, which is equivalent to a situation that the normal vector of the joint surfaces of the first receiving coil 5 and the excitation coil 4 of the differential eddy current internal inspection probe is parallel to the axial direction of the inspected pipeline. At this time, the two receiving coils (i.e., the first receiving coil 5 and the second receiving coil 6) placed in front and back pass through the defect successively. Such a way is suitable for inspecting defects with the defect direction angled with respect to the scanning direction at an included angle of 45°-90°.

Figure 8:
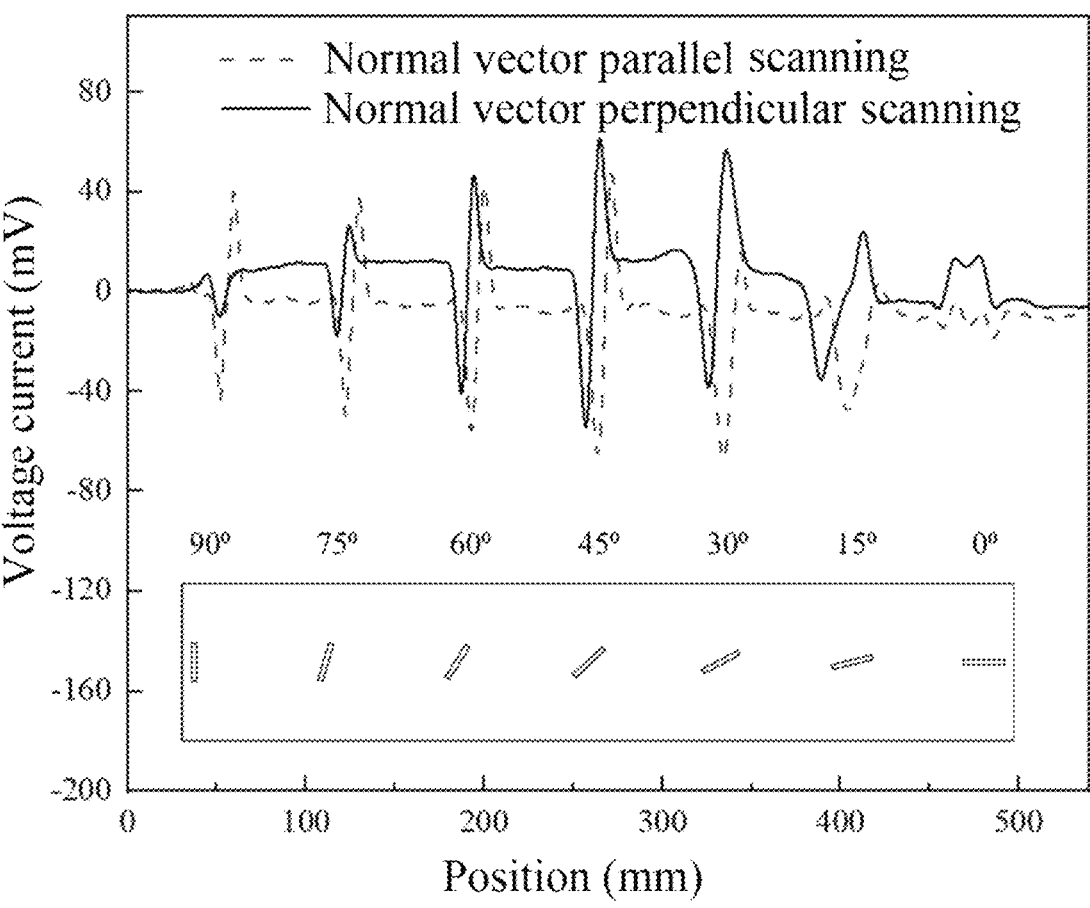
FIG. 8 is a schematic diagram of a voltage-position curve of two placement modes according to Embodiment 1 of the present disclosure.

FIG. 8 is results obtained by scanning cracks from 0-90 degrees, respectively, by two placement ways. Apparently, the normal vector perpendicular scanning (i.e., normal vector is perpendicular to the axial direction of the inspected pipeline) is suitable for inspecting defects of 0°-45°, and normal vector parallel scanning (that is, the normal vector is parallel to the axial direction of the inspected pipeline) is suitable for inspecting defects of 45°-90°.

The differential eddy current internal inspection probe in this embodiment has two placement ways, one is suitable for inspecting defects with the defect direction angled with respect to the scanning direction at an included angle of 0°-45°, and the other is suitable for inspecting defects with the defect direction angled with respect to the scanning direction at an included angle of 45°-90°. Therefore, the differential eddy current internal inspection probe in this embodiment can inspect the defect at any angle.

In this embodiment, the distance can be quantitatively inspected through an output signal of a single receiving coil. The farther the differential eddy current inner inspection probe is from the surface of the inspected pipeline, the smaller an output signal value of the single receiving coil. Therefore, in this embodiment, the output signal and the distance can be calibrated in advance. After obtaining the output signal (i.e., the first voltage signal or the second voltage signal) of the single receiving coil (i.e., the first receiving coil 5 or the second receiving coil 6), the calibration result can be used to determine distance between the single receiving coil and the surface of the inspected pipeline. Specifically, a calibration way may be achieved using a BP (back-propagation) neural network model, that is, the BP neural network model is trained in advance according to multiple historical output signals and the distance corresponding to each historical output signal to obtain a trained BP neural network model. After the output signal of the single receiving coil is obtained, the output signal is directly used as an input, and the distance between the single receiving coil and the surface of the inspected pipeline can be determined by using the trained BP neural network model.

In this embodiment, whether the existence of a defect below a certain receiving coil and/or the type of the defect can be determined by performing differential processing on the output signals of two receiving coils, so as to achieve the purpose of defect inspection and identification. The differential signal is not 0, indicating that there is a defect below the receiving coil. When the inspected pipeline is not subjected to direct current magnetization, no defect is inspected; and when the inspected pipeline is subjected to direct current magnetization, the defect is inspected; it is indicated that the defect below the receiving coil is a buried defect or an outer surface defect. When the inspected pipeline is not subjected to direct current magnetization, the defect is inspected; and when the inspected pipeline is subjected to direct current magnetization, the defect is also inspected, it is indicated that the defect below the receiving coil is an inner surface defect.

In this embodiment, the data of the single receiving coil can be used for quantitatively ranging, and the data of the two receiving coils can be differentially processed to identify quantitative defects, such that the differential eddy current internal inspection probe in this embodiment has the advantages of achieving ranging and defect inspection.

Embodiment 2

An arrayed probe is provided in this embodiment, including multiple differential eddy current internal inspection probes of Embodiment 1.

Figure 9:
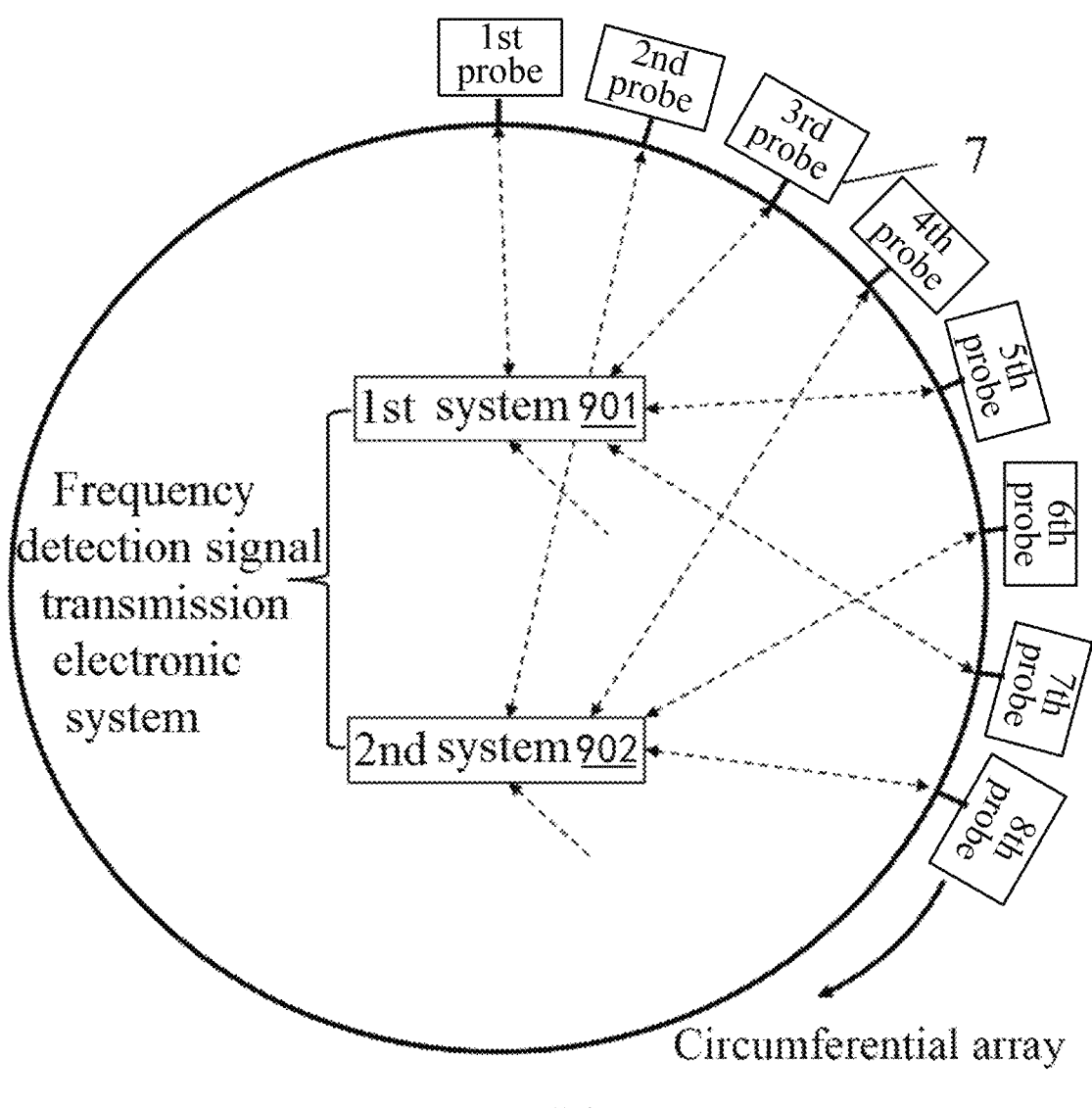
FIG. 9 is a structural schematic diagram of an arrayed probe according to Embodiment 2 of the present disclosure.

As shown in FIG. 9, the multiple differential eddy current internal inspection probes 7 are distributed in an array in a circumferential direction, and excitation coils of the adjacent differential eddy current internal inspection probes 7 are energized with alternating currents with different frequencies.

In this embodiment, the arrayed probe further includes a first frequency detection signal transmission electronic system (i.e., first system 901 in FIG. 8), and a second frequency detection signal transmission electronic system (i.e., second system 902 in FIG. 8), so as to making the alternating electrical currents fed into the excitation coils 7 in the adjacent differential eddy current internal inspection probes 7 have different frequencies.

Any of the differential eddy current internal inspection probes 7 is selected as a first differential eddy current internal inspection probe, and all the differential eddy current internal inspection probes 7 are sequenced in a clockwise or counterclockwise direction. The first frequency detection signal transmission electronic system is connected to odd-numbered differential eddy current internal inspection probes 7, and the second frequency detection signal transmission electronic system is connected to even-numbered differential eddy current internal inspection probes 7. That is, the first frequency detection signal transmission electronic system is connected to the first, the third, the fifth, the seventh, the ninth . . . differential eddy current internal inspection probes, and the second frequency detection signal transmission electronic system is connected to the second, the fourth, the sixth, the eighth, the tenth . . . differential eddy current internal inspection probes, making the two adjacent differential eddy current internal inspection probes 7 connected to different frequency detection signal transmission electronic systems, that is, respectively connected to the first frequency detection signal transmission electronic system and the second frequency detection signal transmission electronic system.

Figure 10:
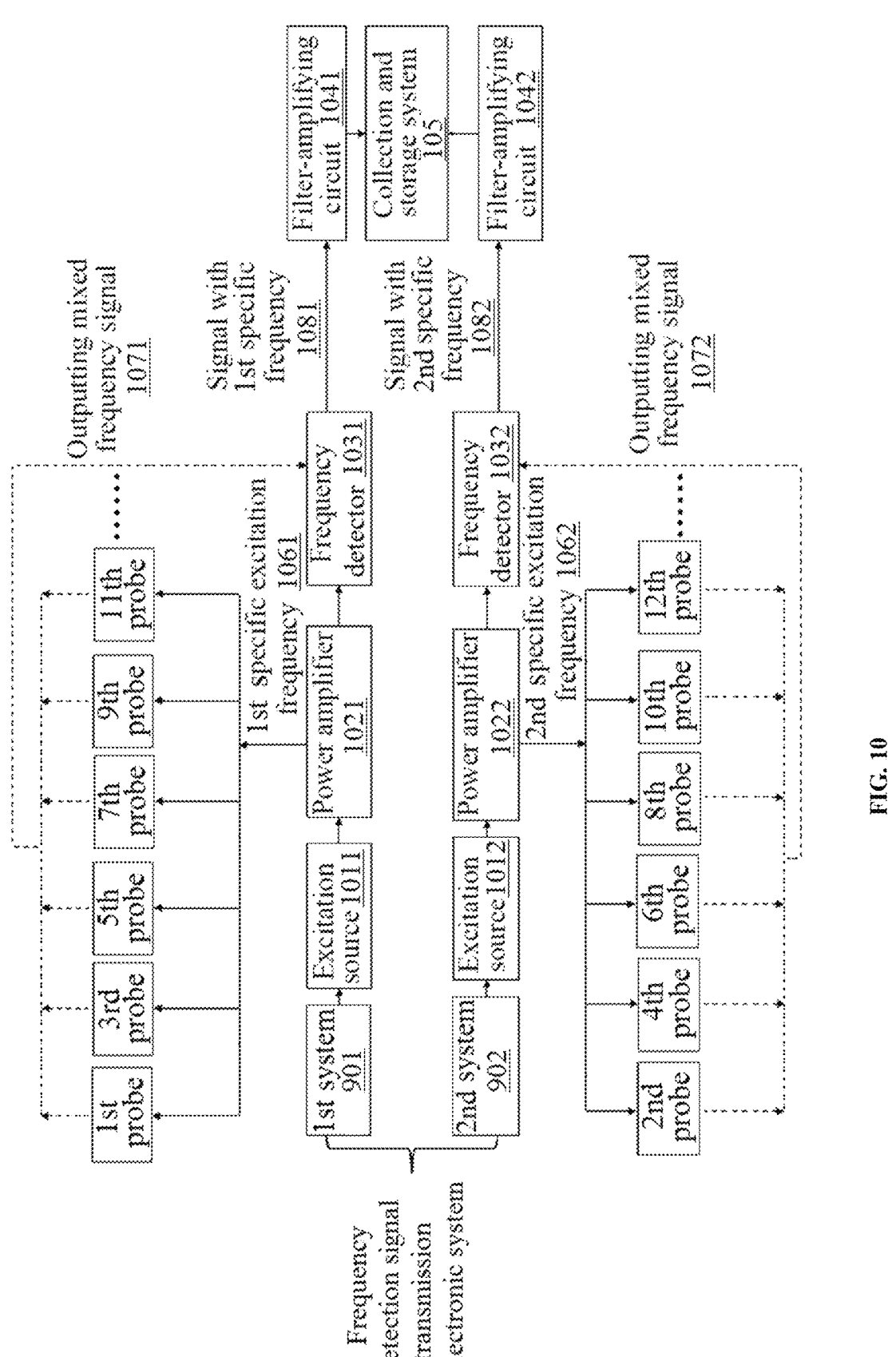
FIG. 10 is a connection schematic diagram of a frequency detection signal transmission electronic system according to Embodiment 2 of the present disclosure.

As shown in FIG. 10, the first frequency detection signal transmission electronic system and the second frequency detection signal transmission electronic system have the same structure. The first frequency detection signal transmission electronic system includes an excitation source 1011, a power amplifier 1021, a frequency detector 1031, and a filter-amplifying circuit 1041 connected in turn.

The excitation source 1011, 1012 is configured to produce an alternating current (which may also be called alternating current excitation) with a predefined frequency according to actual working conditions, and to transmit the alternating current to the power amplifier 1021, 1022. The predefined frequency of the alternating currents generated by the excitation source 1011 in the first frequency detection signal transmission electronic system is different from that in the second frequency detection signal transmission electronic system. The predefined frequency of the alternating current generated by the first frequency detection signal transmission electronic system is the first specific excitation frequency 1061, and the predefined frequency of the alternating current generated by the second frequency detection signal transmission electronic system is the second specific excitation frequency 1062, thus making the frequencies of the alternating currents fed into the two adjacent differential eddy current inspection probes 7 different.

The power amplifier 1021, 1022 is connected to the differential eddy current internal inspection probe 7. The power amplifier 1021, 1022 is configured to amplify the alternating current with the predefined frequency generated by the excitation source 1011, 1012 according to actual working conditions, and to feed the amplified alternating current into the connected differential eddy current internal inspection probe 7. The frequency of the amplified alternating current is still the predefined frequency.

The frequency detector 1031, 1032 is connected to the differential eddy current internal inspection probe 7. The frequency detector 1031, 1032 is configured to extract a signal with the predefined frequency 1081, 1082 from a mixed frequency signal 1071, 1072 output by the differential eddy current internal inspection probe 7 and to transmit the signal to the filter-amplifying circuit 1041, 1042. The mixed frequency signal 1071, 1072 includes a first voltage signal and a second voltage signal. The signal with the predefined frequency 1081, 1082 includes a first voltage signal and a second voltage signal with the predefined frequency as the frequency.

The filter-amplifying circuit 1041, 1042 is configured to amplify, filter and denoise the signal with the predefined frequency 1081, 1082, so as to obtain a signal after filtering and denoising.

In this embodiment, the arrayed probe may further include a collection and storage system 105, which is connected to the filter-amplifying circuit 1041 in the first frequency detection signal transmission electronic system and the filter-amplifying circuit 1042 in the second frequency detection signal transmission electronic system. The filter-amplifying circuit 1041, 1042 is configured to transmit the signal after filtering and denoising to the collection and storage system 105, and the collection and storage system 105 may be configured to collect the signal after filtering and denoising in real time.

In this embodiment, each of the first and second frequency detection signal transmission electronic systems can generate an alternating current excitation with a specific frequency, which is transmitted to the connected differential eddy current inspection probe 7 after passing through the power amplifier 1021, 1022. Because the two adjacent differential eddy current inspection probes 7 are connected to different frequency detection signal transmission electronic systems, the excitation frequencies in the adjacent differential eddy current inspection probes 7 are different, and meanwhile, the frequency detector 1031, 1032 can extract a receiving signal with the specific frequency, further reducing the signal interference between the adjacent differential eddy current inspection probes 7. A signal output by the frequency detector 1031, 1032 is transmitted to the filter-amplifying circuit 1041, 1042 for amplifying, filtering and denoising, and then the signal is stored by the collection and storage system 105.

The frequency detection signal transmission electronic systems designed in this embodiment can add excitations with different frequencies to the adjacent differential eddy current internal inspection probes 7, and extract signals with the same frequency as the excitation coil from the corresponding receiving coil, thus reducing the interference between the adjacent differential eddy current internal inspection probes 7 and reducing the noise. Therefore, the arrayed probe in this embodiment can reduce the interference between the differential eddy current internal inspection probes 7 as the adjacent differential eddy current internal inspection probes 7 adopt the alternating current excitations with different frequencies.

This embodiment provides an arrayed orthogonal excitation differential sensing probe and a frequency detection signal transmission electronic system, which can carry out nondestructive inspection on oil and gas pipelines, and can inspect the inner surface defects (such as cracks, corrosion and other defects) of the inspected pipeline in a case that the inspected pipeline is not magnetized. When the inspected pipeline is magnetized to an incremental permeability sensitive region, the inner surface defects, buried defects and outer surface defects of the inspected pipeline can be inspected under high frequency excitation. The combination of single excitation coil and double receiving coil adopted by the differential eddy current internal inspection probe 7 can improve the signal-to-noise ratio of the collected signal. Meanwhile, the unique coil structure also reduces the volume of a single differential eddy current internal inspection probe 7, which can effectively increase the number of arrays and improve the inspection accuracy during circumferential array. The frequency detection signal transmission electronic systems can add the excitations with different frequencies to the adjacent differential eddy current inspection probes 7, and can extract signals with the same frequency as the excitation coil from the corresponding receiving coil, thus reducing the interference between the adjacent differential eddy current inspection probes 7 and reducing the noise.

Embodiment 3

A defect inspection device is provided by this embodiment, including a direct current magnetization component and an inspection component. The inspection component is a differential eddy current internal inspection probe of Embodiment 1 or an arrayed probe of Embodiment 2.

The direct current magnetization component is located in an inspected pipeline, is in contact with an inner surface of the inspected pipeline, and is configured to perform direct current magnetization on the inspected pipeline.

The inspection component is located in the inspected pipeline, and is configured to inspect inner surface defects, buried defects and outer surface defects of the inspected pipeline when the inspected pipeline is subjected to direct current magnetization, and to inspect the inner surface defects of the inspected pipeline when the inspected pipeline is not subjected to direct current magnetization. Types of the inner surface defects, buried defects and outer surface defects include cracks and corrosion.

Figure 11:
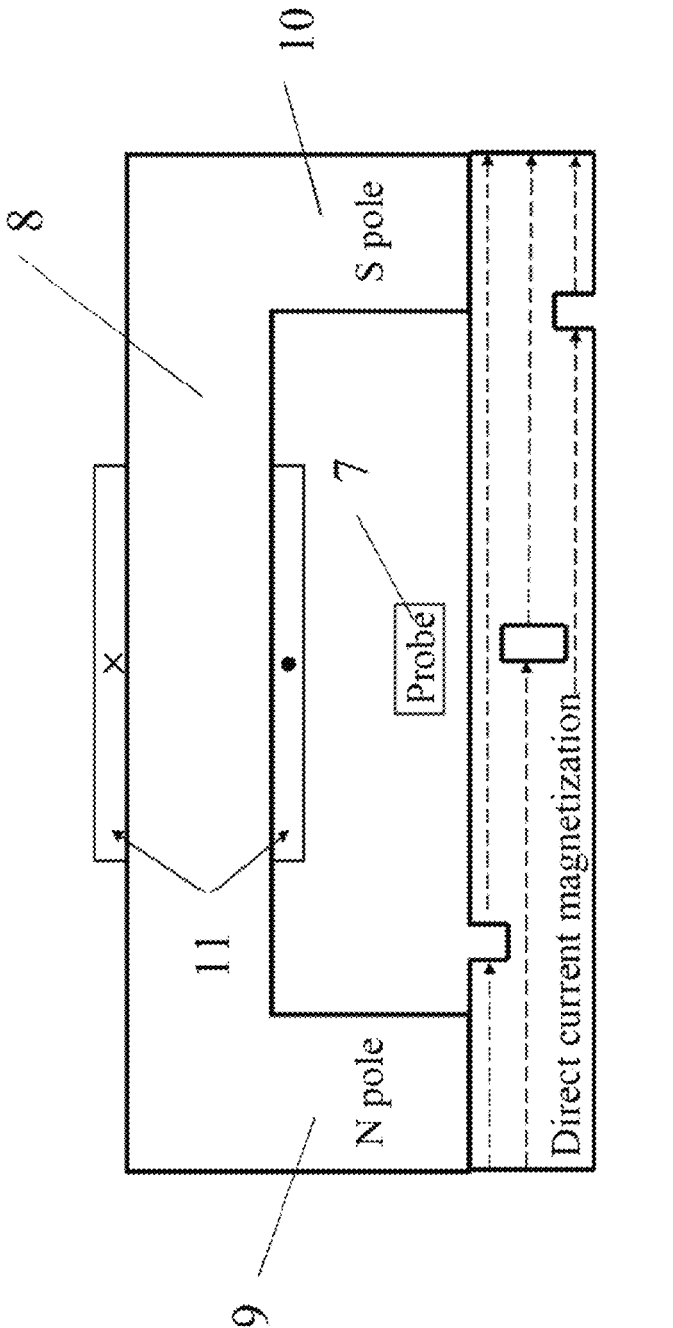
FIG. 11 is a structural schematic diagram of a direct current magnetization component according to Embodiment 3 of the present disclosure.

As shown in FIG. 11, the direct current magnetization component includes a U-shaped yoke 8, and a first magnetic pole 9 and a second magnetic pole 10 of the U-shaped yoke 8 are both in contact with the inner surface of the inspected pipeline. The inspection component is located between the first magnetic pole 9 and the second magnetic pole 10, and the distance from the inspection component to the first magnetic pole 9 is equal to the distance from the inspection component to the second magnetic pole 10.

A coil 11 is installed on the U-shaped yoke 8. When the coil 11 is energized with a direct current, the U-shaped yoke 8 and the inspected pipeline form a complete magnetic loop to perform direct current magnetization on the inspected pipeline. Or, a permanent magnet is installed on each of the first magnetic pole 9 and the second magnetic pole 10 to perform direct current magnetization on the inspected pipeline.

When a mode that the coil 11 is installed on the U-shaped yoke 8, and the inspected pipeline is subjected to direct current magnetization by feeding the direct current into the coil 11, the direct current magnetization degree of the inspected pipeline can be adjusted by adjusting the direct current. When a mode that the permanent magnets are installed on the first magnetic pole 9 and the second magnetic pole 10 to perform the direct current magnetization on the inspected pipeline, the direct current magnetization degree of the inspected pipeline can be adjusted by adjusting the material and volume of the permanent magnet.

Embodiment 4

A defect inspection method is provided by this embodiment, which runs based on the defect inspection device of Embodiment 3. The defect inspection method includes the following steps.

When outer surface defects or buried defects need to be inspected, the inspected pipeline is subjected to direct current magnetization using a direct current magnetization component, and the defects of the inspected pipeline are inspected using the inspection component. When the inner surface defects need to be inspected, the defects of the inspected pipeline are inspected using the inspection component; or the inspected pipeline is subjected to direct current magnetization using the direct current magnetization component, and the defects of the inspected pipeline are inspected using the inspection component.

When the inspection component is the differential eddy current internal inspection probe, the defect inspection method further includes the following steps: when a defect with a defect angle of 0-45 degrees needs to be inspected, a normal vector of joint surfaces of a first receiving coil and an excitation coil of the differential eddy current internal inspection probe is set to be perpendicular to an axial direction of the inspected pipeline. When a defect with a defect angle of 45-90 degrees needs to be inspected, the normal vector of the joint surfaces of the first receiving coil and the excitation coil of the differential eddy current internal inspection probe is set to be parallel to the axial direction of the inspected pipeline. The defect angle is an included angle between a length direction of the defect and the axial direction of the inspected pipeline.

Figure 12:
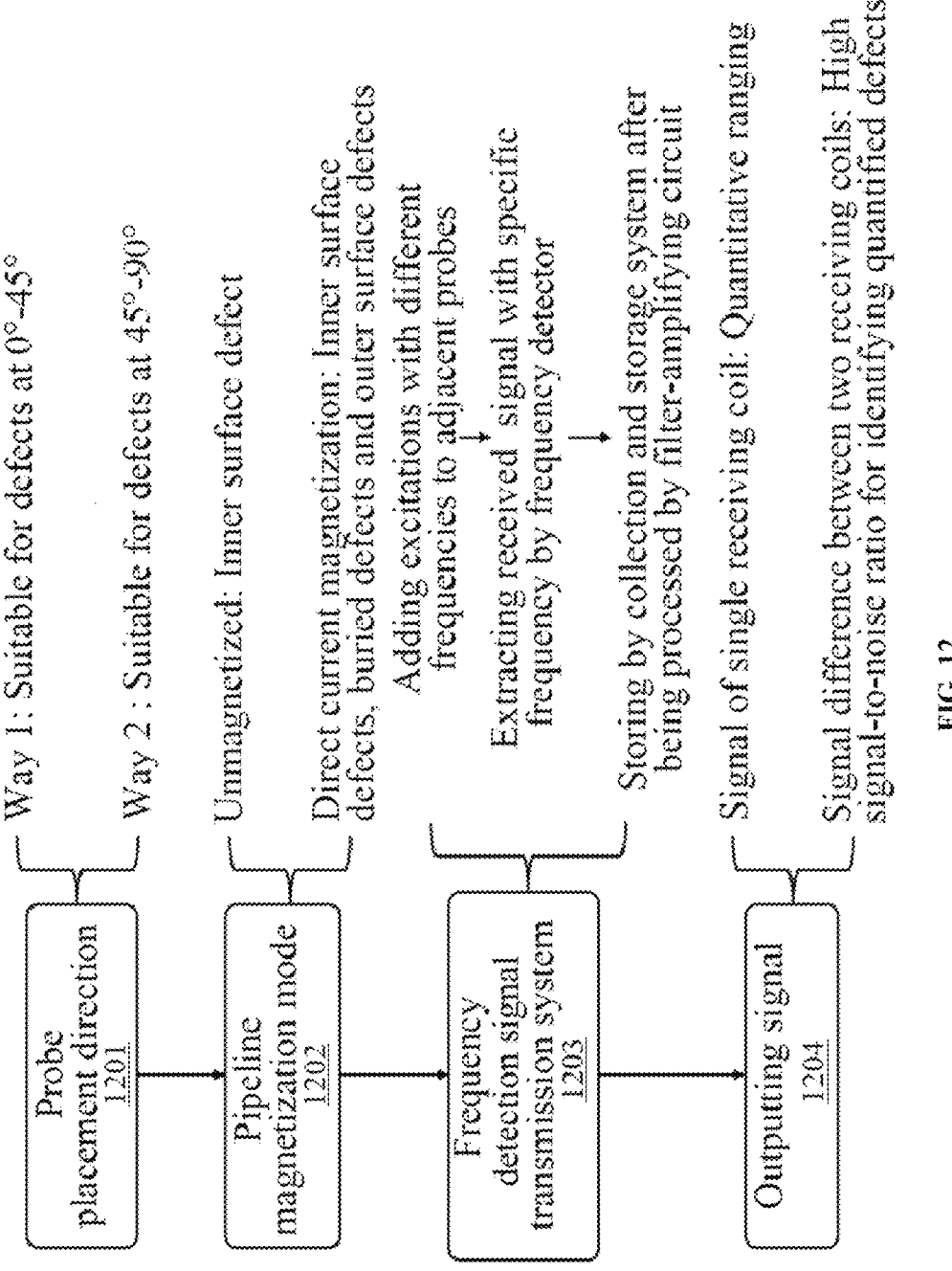
FIG. 12 is a schematic diagram of the principle of a defect inspection method according to Embodiment 4 of the present disclosure.

As shown in FIG. 12, the principle of the defect inspection method may include the probe placement direction 1201, the pipeline magnetization mode 1202, the frequency detection signal transmission 1203, and the signal outputting 1204. The probe placement direction 1201 may include two ways: the way 1 that is suitable for detecting the defect with a defect angle of 0-45 degrees, the way 2 that is suitable for detecting the defect with a defect angle of 45-90 degrees. The pipeline magnetization mode 1202 may include two modes: an inspection mode when an inspected pipeline is not subjected to direct current magnetization, and an inspection mode when an inspected pipeline is subjected to direct current magnetization. The frequency detection signal transmission 1203 may include adding excitations with different frequencies to adjacent probes, extracting received signal with specific frequency by the frequency detector, and storing by the collection and storage system after being processed by the filter-amplifying circuit. The output signal 1204 may include a signal from single receiving coil and a difference between signals from two receiving coils.

The technical features of the above embodiments can be combined at will. In order to make the description concise, not all possible combinations of the technical features in the above embodiments are described. However, it should be considered that these combinations of technical features fall within the scope recorded in this specification provided that these combinations of technical features do not have any conflict.

Specific examples are used herein for illustration of the principles and implementation methods of the present disclosure. The description of the embodiments is merely used to help illustrate the method and its core principles of the present disclosure. In addition, a person of ordinary skill in the art can make various modifications in terms of specific embodiments and scope of application in accordance with the teachings of the present disclosure. In conclusion, the content of this specification shall not be construed as a limitation to the present disclosure.

What is claimed is:

1. A differential eddy current internal inspection probe, comprising an excitation coil, a first receiving coil, and a second receiving coil; wherein, the excitation coil is located between the first receiving coil and the second receiving coil, the first receiving coil and the second receiving coil are symmetrically attached to both sides of the excitation coil, and bottom surfaces of the first receiving coil, the excitation coil and the second receiving coil are located in a same plane to form a bottom surface of the differential eddy current internal inspection probe;

the excitation coil is energized with an alternating current to generate induced eddy current fields in an inspected pipeline;

the first receiving coil and the second receiving coil are opposite in winding direction; the first receiving coil is configured to receive an induced magnetic field generated by an induced eddy current field at a first position of the inspected pipeline and to output a first voltage signal; the second receiving coil is configured to receive an induced magnetic field generated by an induced eddy current field at a second position of the inspected pipeline and to output a second voltage signal; the first position is a position, corresponding to a position of the first receiving coil, in the inspected pipeline, and the second position is a position, corresponding to a position of the second receiving coil, in the inspected pipeline; and the differential eddy current internal inspection probe is located in the inspected pipeline, and the bottom surface of the differential eddy current internal inspection probe is parallel to an axis of the inspected pipeline; when the inspected pipeline is subjected to direct current magnetization, the differential eddy current internal inspection probe is configured to inspect inner surface defects, buried defects and outer surface defects of the inspected pipeline based on a difference value between the first voltage signal and the second voltage signal; and when the inspected pipeline is not subjected the direct current magnetization, the differential eddy current internal inspection probe is configured to inspect the inner surface defects of the inspected pipeline based on the difference value between the first voltage signal and the second voltage signal; and types of the inner surface defects, buried defects and outer surface defects comprise cracks and corrosion.

2. The differential eddy current internal inspection probe according to claim 1, wherein each of the excitation coil, the first receiving coil and the second receiving coil is a semicircular coil formed by winding a wire, an outer surface of the semicircular coil comprises two semicircular surfaces, one curved surface, and one plane; each semicircular surface comprises a straight segment and an arc segment;

a plane of the first receiving coil is attached to a straight segment of one semicircular surface of the excitation coil, and a plane of the second receiving coil is attached to a straight segment of another semicircular surface of the excitation coil; and a bottom surface of the first receiving coil is one semi-circular surface of the first receiving coil, a bottom surface of the excitation coil is a plane of the excitation coil, and a bottom surface of the second receiving coil is one semicircular surface of the second receiving coil.

3. The differential eddy current internal inspection probe according to claim 2, wherein a difference value between an inner diameter and an outer diameter of the semicircular surface of the excitation coil, a height of the first receiving coil and a height of the second receiving coil are equal.

4. An arrayed probe, comprising a plurality of differential eddy current internal inspection probes according to claim 1, wherein the plurality of differential eddy current internal inspection probes are distributed in an array in a circumferential direction, and excitation coils of adjacent differential eddy current internal inspection probes are energized with alternating currents with different frequencies.

5. The arrayed probe according to claim 4, further comprising a first frequency detection signal transmission electronic system and a second frequency detection signal transmission electronic system, wherein any of the differential eddy current internal inspection probes is selected as a first differential eddy current internal inspection probe, and all the differential eddy current internal inspection probes are sequenced in a clockwise or counterclockwise direction; the first frequency detection signal transmission electronic system is connected to odd-numbered differential eddy current internal inspection probes; the second frequency detection signal transmission electronic system is connected to even-numbered differential eddy current internal inspection probes;

the first frequency detection signal transmission electronic system and the second frequency detection signal transmission electronic system have a same structure; the first frequency detection signal transmission electronic system comprises an excitation source, a power amplifier, a frequency detector, and a filter-amplifying circuit connected in turn;

the excitation source is configured to generate an alternating current with a predefined frequency, and alternating currents generated by the first frequency detection signal transmission electronic system and the second frequency detection signal transmission electronic system have different predefined frequencies, respectively;

the power amplifier is connected to differential eddy current internal inspection probes, and is configured to amplify the alternating current with the predefined frequency, and to feed the amplified alternating current into the differential eddy current internal inspection probes;

the frequency detector is connected to the differential eddy current internal inspection probes, and is configured to extract a signal with the predefined frequency from a mixed frequency signal output by the differential eddy current internal inspection probes, wherein the mixed frequency signal comprises the first voltage signal and the second voltage signal; and the filter-amplifying circuit is configured to perform amplification, filtering and noise reduction on the signal with the predefined frequency, to obtain a signal after filtering and noise reduction.

6. A defect inspection device, comprising a direct current magnetization component and an inspection component, wherein the inspection component is the differential eddy current internal inspection probe according to claim 1;

the direct current magnetization component is located in the inspected pipeline, is in contact with an inner surface of the inspected pipeline, and is configured to perform the direct current magnetization on the inspected pipeline;

the inspection component is located in the inspected pipeline, and is configured to inspect the inner surface defects, the buried defects and the outer surface defects of the inspected pipeline when the inspected pipeline is subjected to the direct current magnetization, and to inspect the inner surface defects of the inspected pipeline when the inspected pipeline is not subjected to the direct current magnetization; and the types of the inner surface defects, buried defects and outer surface defects comprise the cracks and corrosion.

7. The defect inspection device according to claim 6, wherein the direct current magnetization component comprises a U-shaped yoke, and a first magnetic pole and a second magnetic pole of the U-shaped yoke are both in contact with the inner surface of the inspected pipeline; the inspection component is located between the first magnetic pole and the second magnetic pole, and a distance from the inspection component to the first magnetic pole is equal to a distance from the inspection component to the second magnetic pole;

a coil is installed on the U-shaped yoke, when the coil is energized with a direct current, the inspected pipeline is subjected to the direct current magnetization.

8. The defect inspection device according to claim 6, wherein the direct current magnetization component comprises a U-shaped yoke, and a first magnetic pole and a second magnetic pole of the U-shaped yoke are both in contact with the inner surface of the inspected pipeline; the inspection component is located between the first magnetic pole and the second magnetic pole, and a distance from the inspection component to the first magnetic pole is equal to a distance from the inspection component to the second magnetic pole;

a permanent magnet is installed on each of the first magnetic pole and the second magnetic pole to perform the direct current magnetization on the inspected pipeline.

9. A defect inspection device, comprising a direct current magnetization component and an inspection component, wherein the inspection component is the arrayed probe according to claim 4;

the direct current magnetization component is located in the inspected pipeline, is in contact with an inner surface of the inspected pipeline, and is configured to perform the direct current magnetization on the inspected pipeline;

the inspection component is located in the inspected pipeline, and is configured to inspect the inner surface defects, the buried defects and the outer surface defects of the inspected pipeline when the inspected pipeline is subjected to the direct current magnetization, and to inspect the inner surface defects of the inspected pipeline when the inspected pipeline is not subjected to the direct current magnetization; and the types of the inner surface defects, buried defects and outer surface defects comprise the cracks and corrosion.

10. The defect inspection device according to claim 9, wherein the direct current magnetization component comprises a U-shaped yoke, and a first magnetic pole and a second magnetic pole of the U-shaped yoke are both in contact with the inner surface of the inspected pipeline; the inspection component is located between the first magnetic pole and the second magnetic pole, and a distance from the inspection component to the first magnetic pole is equal to a distance from the inspection component to the second magnetic pole;

a coil is installed on the U-shaped yoke, when the coil is energized with a direct current, the inspected pipeline is subjected to the direct current magnetization.

11. The defect inspection device according to claim 9, wherein the direct current magnetization component comprises a U-shaped yoke, and a first magnetic pole and a second magnetic pole of the U-shaped yoke are both in contact with the inner surface of the inspected pipeline; the inspection component is located between the first magnetic pole and the second magnetic pole, and a distance from the inspection component to the first magnetic pole is equal to a distance from the inspection component to the second magnetic pole;

a permanent magnet is installed on each of the first magnetic pole and the second magnetic pole to perform the direct current magnetization on the inspected pipeline.

12. A defect inspection method, which runs based on the defect inspection device according to claim 6, comprising:

in a case that the outer surface defects or the buried defects are inspected, performing the direct current magnetization on the inspected pipeline using the direct current magnetization component, and performing defect inspection on the inspected pipeline using the inspection component; and in a case that the inner surface defects are inspected, carrying out one of: performing defect inspection on the inspected pipeline using the inspection component; and performing the direct current magnetization on the inspected pipeline using the direct current magnetiza-tion component, and performing defect inspection on the inspected pipeline using the inspection component.

13. The method according to claim 12, wherein when the inspection component is the differential eddy current inter-nal inspection probe, the defect inspection method further comprises:

in a case that a defect with a defect angle of 0-45 degrees is inspected, setting a normal vector of joint surfaces of the first receiving coil and the excitation coil of the differential eddy current internal inspection probe to be perpendicular to an axial direction of the inspected pipeline; and in a case that a defect with a defect angle of 45-90 degrees is inspected, setting a normal vector of the joint surfaces of the first receiving coil and the excitation coil of the differential eddy current internal inspection probe to be parallel to an axial direction of the inspected pipeline, wherein the defect angle is an included angle between a length direction of the defect and the axial direction of the inspected pipeline.

14. A defect inspection method, which runs based on the defect inspection device according to claim 9, comprising:

in a case that the outer surface defects or the buried defects are inspected, performing the direct current magnetization on the inspected pipeline using the direct current magnetization component, and performing defect inspection on the inspected pipeline using the inspection component; and in a case that the inner surface defects are inspected, carrying out one of: performing defect inspection on the inspected pipeline using the inspection component; and performing the direct current magnetization on the inspected pipeline using the direct current magnetiza-tion component, and performing defect inspection on the inspected pipeline using the inspection component.

\* \* \* \* \*